United States Patent

Ouellette

[11] Patent Number: 5,615,813
[45] Date of Patent: Apr. 1, 1997

[54] VEHICLE LONG LOAD STABILIZER

[76] Inventor: Philip G. Ouellette, 7 Hadley Rd., Newton, N.H. 03858

[21] Appl. No.: 393,205

[22] Filed: Feb. 23, 1995

[51] Int. Cl.[6] .................................................. B60R 11/06
[52] U.S. Cl. ............................................ 224/405; 224/501
[58] Field of Search ................................. 224/405, 521, 224/501, 495, 519; 296/26

[56] References Cited

U.S. PATENT DOCUMENTS 4,856,686  8/1989  Workentine ........................ 224/521 X
5,451,088  9/1995  Broad ................................. 224/521 X
5,454,496  10/1995  Sumida et al. ..................... 224/521 X
5,458,389  10/1995  Young ................................ 224/521 X

*Primary Examiner*—Renee S. Luebke

[57] ABSTRACT

A vehicle long load stabilizing apparatus which is attachable to a vehicle's standard tube type trailer hitch via a clevis pin. The apparatus consists of a horizontal member, a vertically angled member, and a horizontal stabilizing member. The apparatus allows longer loads to be carried, in a more convenient and safe manner, and, dissembles for convenient transport and storage within the vehicle when not in use.

1 Claim, 4 Drawing Sheets

VEHICLE LONG LOAD STABILIZER

REFERENCES CITED

| References cited U.S. PATENT DOCUMENTS | | | |
|---|---|---|---|
| 5,267,748 | 12/1993 | CURRAN | 280/415.1 |
| 5,120,102 | 6/1992 | CUMBLE | 296/3 |
| 5,116,096 | 5/1992 | TAYLOR | 296/26 |
| 5,106,002 | 4/1992 | SMITH et al | 224 |
| 4,906,015 | 5/1990 | LaCROIX et al | 296/3 |
| 4,856,840 | 8/1989 | HANLEY | 296/26 |

BACKGROUND OF THE INVENTION

Most vehicle manufacturers today are building small to midsize pickup trucks, vans, and utility vehicles that are at best suited to carrying small sized loads. However, this limits the utility of the vehicle when it comes to carrying longer loads, such as lumber, carpet, pipe, etc., in a safe and simple manner. Typically one would have to have the materials delivered, at additional cost and at inconvenient times. Otherwise, one must purchase, at a much higher expense and complexity, other means of securing and stabilizing a longer load than the vehicle can normally safely carry.

SUMMARY OF PRIOR ART

Although various methods exist to carry and stabilize longer loads, the most popular of these tend to be roof mounted racks of wood or metal designed to accommodate pickup trucks, automobiles, utility, and other vehicles. These methods accomplish the same ends but they tend to be more expensive and difficult to use, requiring the user to lift the materials above their heads in order to secure the load to the top of the rack. The following methods more closely relate to the invention at hand, but have similar limitations and drawbacks: U.S. Pat. No. 5,267,748 discloses a vehicle tool platform apparatus adapted for use with, and attachment to, a pickup truck or van. Said truck or van having a rear trailer hitch, but does not allow for portage of longer loads. U.S. Pat. No. 5,120,102 discloses a load bearing vehicle extension that is secured to the rear of a vehicle by means of a standard trailer hitch ball, and uses a series of chains to stabilize the attachment, which is adjustable for different length and width loads. This device requires that a chain mounting surface be permanently attached to the pickup truck, where the load being carried is at a dramatic angle in relationship to the vehicle bed, furthermore, that the material being carried is only supported at the point of contact with the pickup bed and at the extended top of the load bearing device. This device requires that the material to be carried be at a sharp angle to the truck cargo area and that only a fraction of the material is in contact with the cargo area. In addition, it is cumbersome to use and transport, and it has limited application in the consumer marketplace. U.S. Pat. No. 5,116,096 discloses a rigid pickup truck cargo supporting "V" shaped frame coupled to the rear of a pickup truck, via the pickup truck's standard trailer type hitch coupler ball. This apparatus must be suspended from the pickup truck, is a "V" shaped frame with a tremendous amount of additional framework needed for attachment, which makes it very inconvenient to use. U.S. Pat. No. 5,106,002 discloses a carrier assembly, for attachment to a receiver, mounted on the rear of a vehicle. The apparatus is comprised of a hitch for attaching the carrying assembly to the receiver, a riser extending upwardly and outwardly from the hitch, an extension projecting rearward from the riser and supporting the basket, and a pivotal connection allowing the basket to be moved for access to the rear of the vehicle. This apparatus allows for transporting additional cargo but does not allow for carrying longer loads than the vehicles cargo area. U.S. Pat. No. 4,906,015 discloses a utility rack designed for attachment to a class II type trailer hitch mounted adjacent the rear bumper of a vehicle and is designed to provide additional storage and transportation space to modern downsized vehicles and not to extend longer load carrying capacity. U.S. Pat. No. 4,856,840 discloses a truck bed extender comprising a platform which is attachable to the rear end of a truck. The apparatus is rectangle in shape and is connected to the pickup truck's cargo area and is not mounted to the vehicles trailer hitch assembly.

SUMMARY OF THE INVENTION

The invention is directed to any vehicle that has a 2" or 1¼" standard square tube received type trailer hitch, and, where the vehicle's standard configuration cannot carry loads longer than the bed length conveniently and in a safe manner. The vehicle long load stabilizer apparatus is constructed of, but not limited to, tubular and flat steel stock and consists of a horizontal member extending rearward from the vehicle's trailer hitch receiver and is connected by means of a clevis pin to the vehicle's standard square tube receiver hitch. This horizontal member extends rearward from the vehicle to a predetermined distance. The horizontal member also has a hole at the end, furthest from the vehicle, to allow connection of an angled member rising vertically upwards at an angle which allows the horizontal stabilizing member to extend 2" to 6" above the vehicle's cargo level. Thereby, allowing maximum contact and weight distribution to be directed toward the cargo bed area of the vehicle and not toward the horizontal load stabilizer bar. This allows longer loads to be carried at the level of the vehicle's cargo area. The vertically angled member is connected to the horizontal member by means of a clevis pin and the horizontal stabilizing member is also held perpendicular to this vertically angled member by means of a clevis pin. The horizontal stabilizing member has flanges on each end further providing lateral stabilization to the load and the components are of such a width to be stored and transported within the vehicle when not in use.

DETAILED DESCRIPTIONS OF THE DRAWINGS

Figure 1:
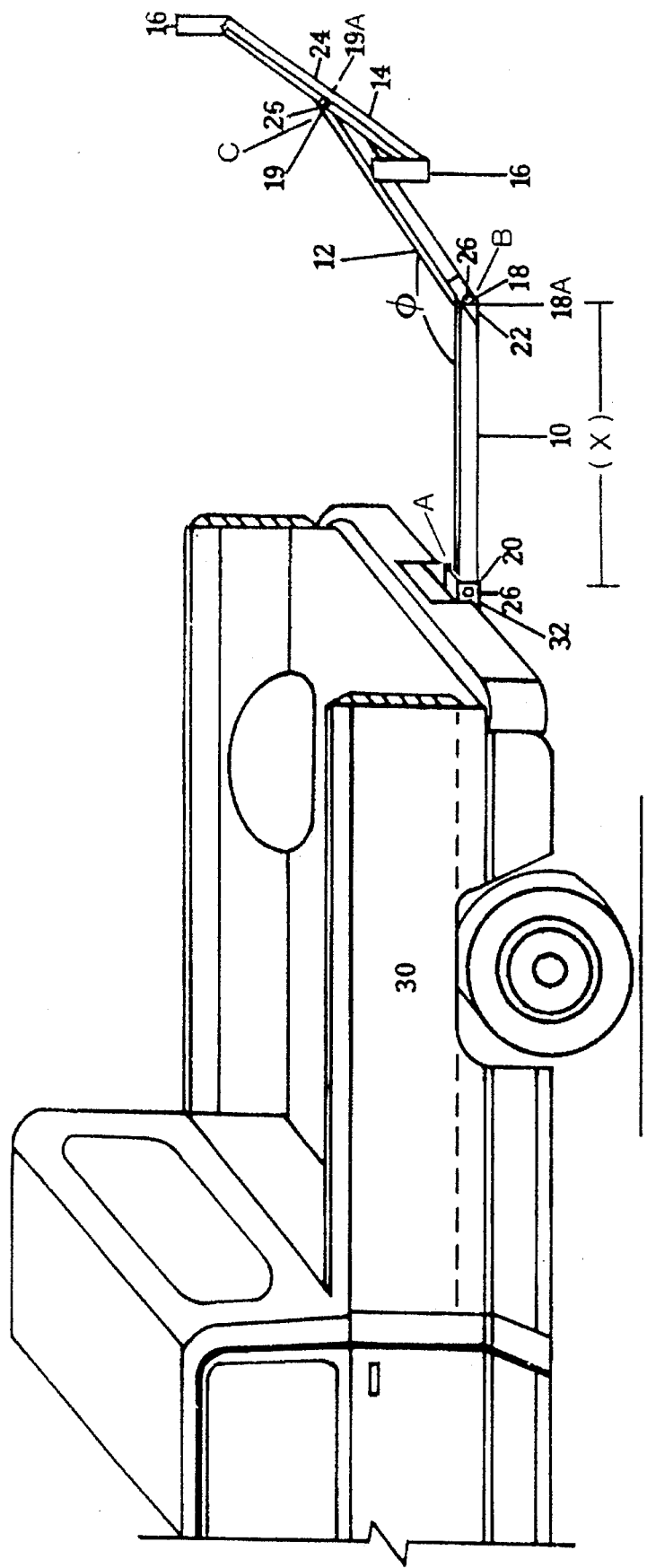
FIG. 1. is a side view of the vehicle long load stabilizing apparatus attached to the rear of the vehicle's tube type trailer hitch receiver.

The invention shown in FIG. 1 is attached to vehicle 30 and the vehicle's standard square type tube receiver hitch assembly 32 and clevis pin 26 at location "A". The horizontal member 10 extends rearward from the vehicle a predetermined distance "(X)" and the vertically angled member 12 is attached to the horizontal member 10 by means of clevis pin 26 at location "B". The vertically angled member 12 extends upwards at an angle "Φ" where the horizontal stabilizing member 14 is connected to the vertically angled member 12 by means of clevis pin 26 at location "C". The horizontal stabilizing member in FIG. 1 is shown in its preferred construction for carrying longer loads and provides lateral stabilization of that load by means of flanges 16 welded on each end of the horizontal stabilizing member 14. The vertically angled member 12 has plates 18 and 19 welded on each side with holes 18A and 19A drilled in them to connect the lower horizontal member 10 and the upper horizontal stabilizing member 14 via two clevis pins 26. The lower horizontal member 10 has two holes 20 & 22 to connect it to the receiver hitch assembly 32 and the vertically angled member 12. The vertically angled member 12 is connected to the lower horizontal member 10 at location "B". The upper horizontal stabilizing member 14 has a hole 24 drilled in it to connect the vertically angled member 12 at location "C" by means of clevis pin 26.

Figure 2:
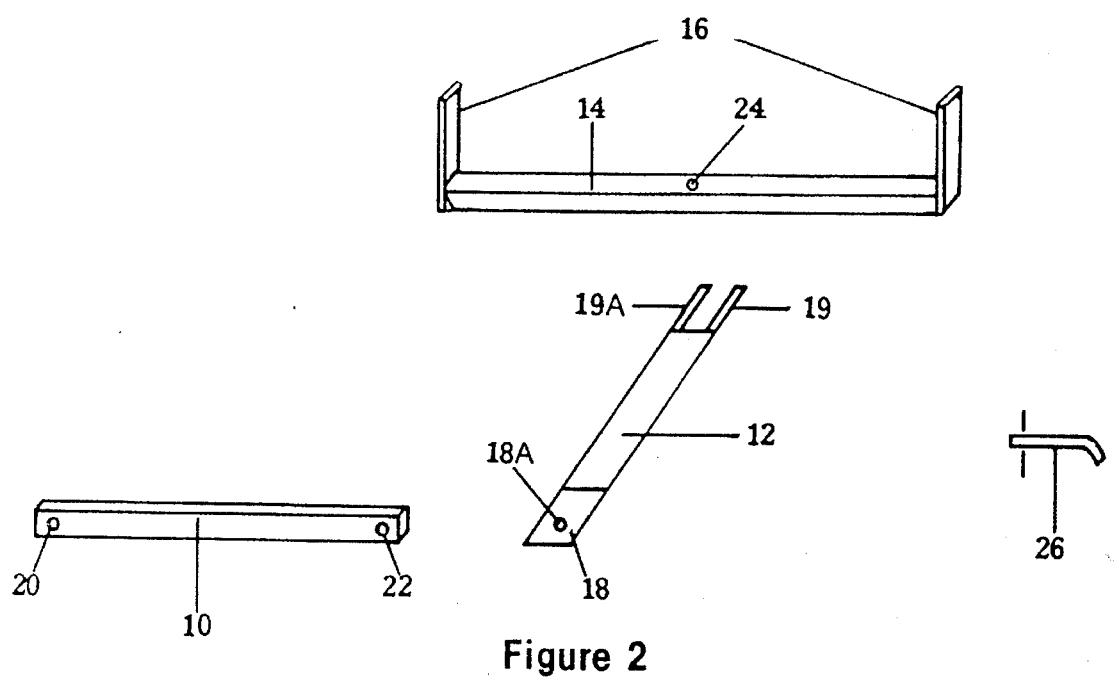
FIG. 2. is a view of the invention showing the component parts that constitute the long load stabilizing apparatus.

The invention shown in FIG. 2 is a detail of the components that comprise the vehicle long load stabilizer. Horizontal member 10 has two holes 20 & 22 drilled for attachment to the vehicle's trailer hitch receiver and vertically angled member 12 with two clevis pins 26. The vertically angled member 12 has two welded flanges 18 and 19 with holes 18A and 19A drilled in them to allow connection to the horizontal member 10 and the horizontal stabilizing member 14. The horizontal member 14 has a hole drilled in its center 24, two lateral stabilizing members 16 welded on each end and is held to the vertically angled member 12 by means of clevis pin 26. The unit members are detachable for convenient transport and storage.

Figure 3:
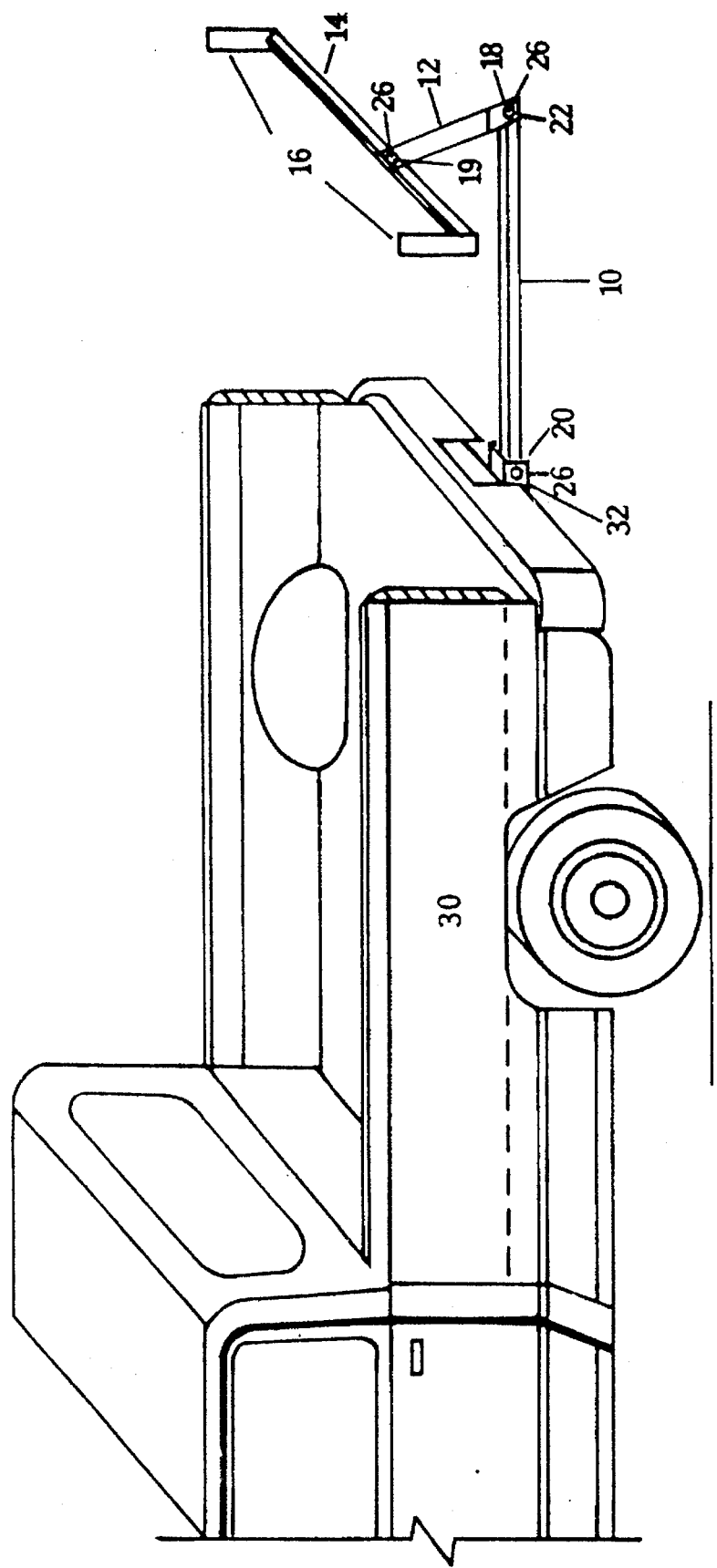
FIG. 3. is an angled view showing an alternate means of attaching the vertically angled member and horizontal stabilizing member so as to orient the invention closer to the vehicle cargo area.

The invention in FIG. 3 is shown attached to a standard tube type receiver hitch 32 of vehicle 30. In its shorter load carrying configuration, the horizontal member 10 is attached to a standard receiver hitch 32 by means of clevis pin 26. The vertically angled member 12 is shown attached to the horizontal member 10 but is rotated 180 degrees, allowing the horizontal stabilizing member 14 to be in closer proximity to the cargo area for shorted loads.

Figure 4:
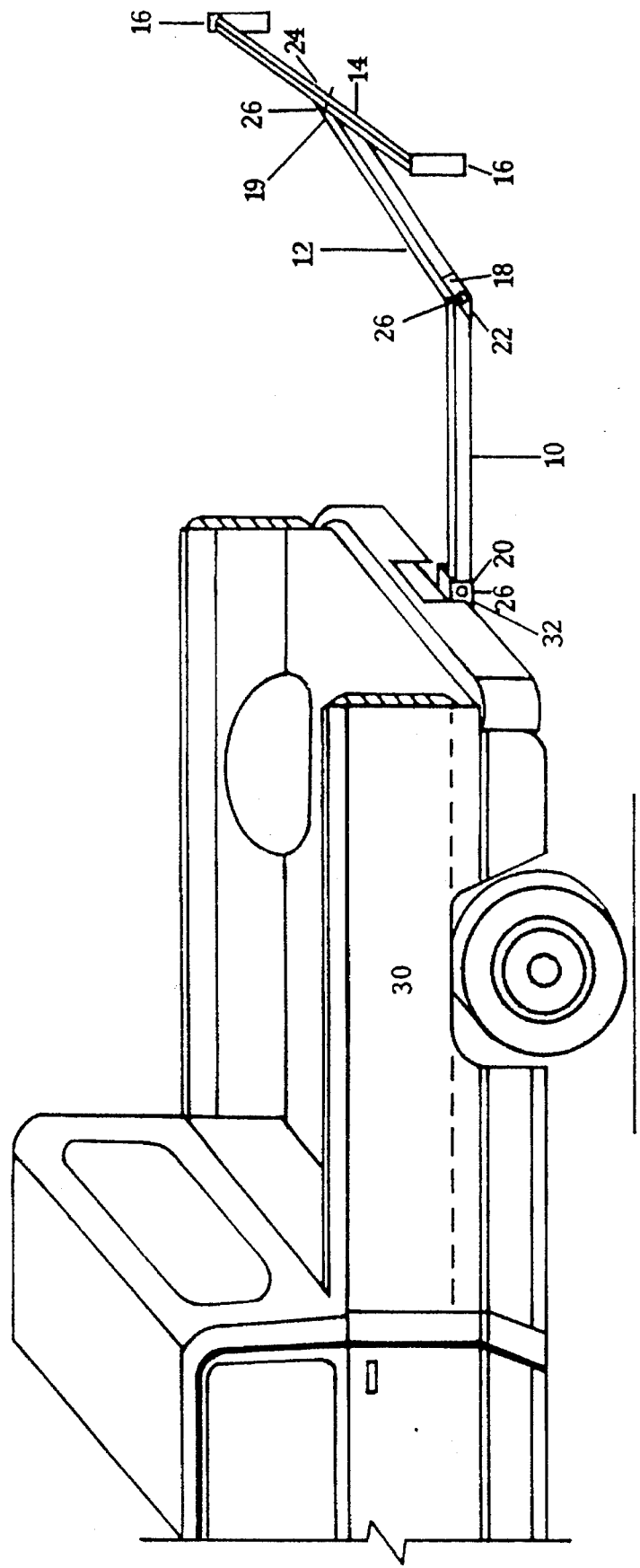
FIG. 4. is an angled view of the invention showing the horizontal stabilizing member rotated 180 degrees to the vertically angled member in order to carry much wider loads without lateral restriction.

The invention in FIG. 4 is shown attached to a standard receiver hitch 32 of vehicle 30. In its standard longer load carrying configuration, the horizontal member 10 and the vertically angled member 12 is attached to each other and the vehicle 30. Also, the horizontal stabilizing member 14 is rotated 180 degrees to the vertically angled member 12 so that the flanges 16 are pointing downwards so as to allow wider loads to be carried.

What is claimed is:

1. A long load stabilizing apparatus, for attachment to a standard trailer hitch receiver on a vehicle having a cargo area, comprising:

a horizontal member adapted to extend substantially rearwardly from the vehicle and to be attached to the hitch receiver via a clevis pin;

a vertically angled member attached, via a second clevis pin, to the horizontal member at such an angle so as to extend above the vehicle's cargo area by 2" to 6";

a horizontal stabilizing member attached via a third clevis pin to the vertically angled member;

wherein the vertically angled member can be attached to the horizontal member in a first position which extends rearwardly from the horizontal member, or in a second position in order to decrease the distance from the horizontal stabilizing member to the cargo area of the vehicle for carrying shorter loads.

\* \* \* \* \*